(No Model.)
J. H. DENIGER.
VEHICLE SPRING.
No. 416,669. Patented Dec. 3, 1889.
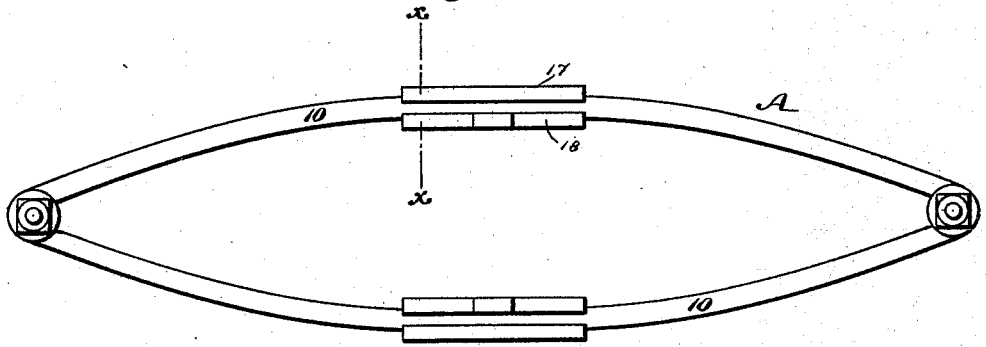
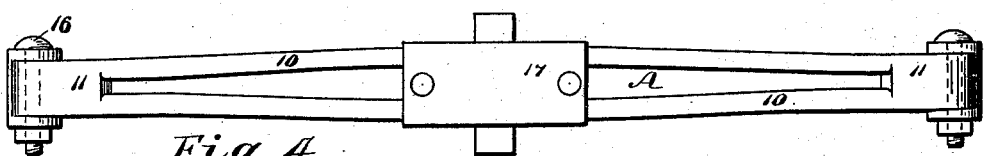
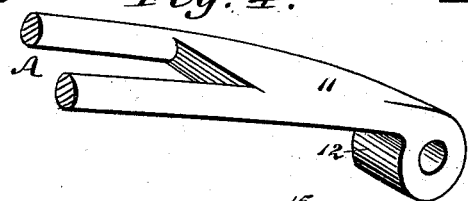
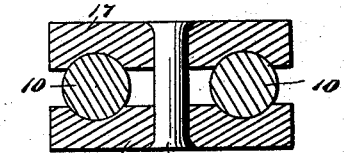
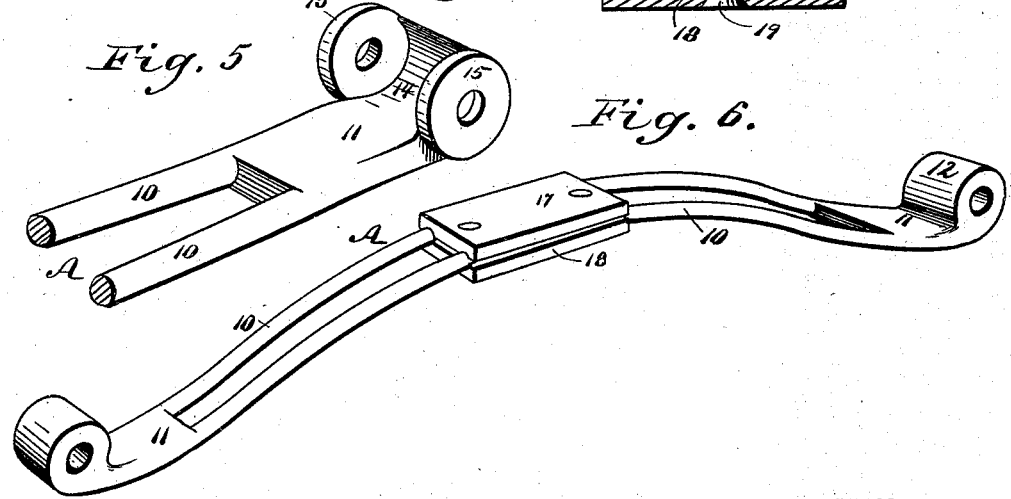
WITNESSES:
John M. Deemer
C. Sedgwick
INVENTOR:
J. H. Deniger
BY Munn & Co.
ATTORNEYS.
N. PETERS, Photo-Lithographer, Washington, D. C.

UNITED STATES PATENT OFFICE.

JOSEPH H. DENIGER, OF BRIDGEPORT, CONNECTICUT, ASSIGNOR TO HIMSELF, STEPHEN R. TOMLINSON, AND JOHN T. LOGAN, ALL OF SAME PLACE.

VEHICLE-SPRING.

SPECIFICATION forming part of Letters Patent No. 416,669, dated December 3, 1889.

Application filed August 10, 1889. Serial No. 320,339. (No model.)

*To all whom it may concern:*

Be it known that I, JOSEPH H. DENIGER, of Bridgeport, in the county of Fairfield and State of Connecticut, have invented a new and useful Improvement in Vehicle-Springs, of which the following is a full, clear, and exact description.

My invention relates to an improvement in vehicle-springs, and has for its object to so construct the spring that a minimum of weight will be combined with a maximum of strength; and the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a side elevation of an elliptic spring constructed in accordance with my invention. Fig. 2 is a plan view of the same. Fig. 3 is a transverse section on line $x\,x$ of Fig. 1. Figs. 4 and 5 are perspective views of the ends of the members of the said elliptic spring, illustrating the manner of coupling the same; and Fig. 6 is a perspective view of a semi-elliptic spring embodying the improvements.

In carrying out the invention I construct the body A of the spring of two or more steel bars or rods 10, circular or oval in cross-section, preferably circular, which rods or bars are arranged parallel or concentric side by side a predetermined distance apart. The ends of the rods or bars are solidly and rigidly connected by welding thereto preferably iron blocks or plates 11, which plates or blocks completely fill the space intervening the bars at their ends, and in the event that a semi-elliptic spring is to be constructed, as shown in Fig. 6, the outer extremities of the blocks or plates 11 are curved upward and bent upon themselves to form eyes 12.

When an elliptic spring is to be made, as shown in Figs. 1 and 2, the end blocks on the upper member of the spring are bent downward upon themselves to form an eye, as shown in Fig. 4, and the end blocks of the lower member are curved upward to form a concave socket 14 and apertured side ears 15, as shown in Fig. 5, and the coupling of the two members is effected by introducing the eyes of the upper member between the ears of the lower member to a contact with the socket-surface 14 and passing suitable bolts 16 through the ears and the eyes, as illustrated in Fig. 2.

The body bars or rods 10 of each member of the spring are bound, strengthened, and connected at the center by upper and lower head-plates 17 and 18 contacting therewith, which plates are provided upon their inner faces with longitudinal channels adapted to receive the bars, as best shown in Figs. 3 and 6, and the two plates are connected by driving rivets 19 or equivalent fastening devices through them between the body-bars, as clearly shown in Fig 3. When rivets are employed, they are driven to place while heated.

It will thus be observed that I construct a spring strong in every particular and exceedingly light, and that no portion of the spring is weakened by the introduction of bolts, as when it is necessary to employ bolts to connect the spring to the vehicle they are passed through the head-plates between the bars in like manner as the rivets illustrated in Fig. 3.

Having thus described my invention, I claim as new and desire to secure by Letters Patent—

1. An improved vehicle-spring consisting of parallel round bars curved from center to their ends and connected at their ends by plates curved to correspond to the curvature of the bars, the said plates having their ends formed into a coupling, and head-plates secured to the top and bottom surfaces of the bars at their centers, substantially as described.

2. An improved elliptical spring consisting of curved parallel bars circular in cross-section and having their ends connected by plates curved to correspond with the curvature of the bars, the plates of the upper member of the spring being provided with eyes and the plates of the lower member with sockets and apertured ears, and head-plates secured to the top and bottom surfaces of the bars at their centers, substantially as herein shown and described.

JOSEPH H. DENIGER.

Witnesses:
GEORGE W. L. HOMMEDIEN,
VICTOR E. WATROUS,